US012649218B2

(12) United States Patent
Röse

(10) Patent No.: US 12,649,218 B2
(45) Date of Patent: Jun. 9, 2026

(54) METHOD AND APPARATUS FOR COMPUTER-IMPLEMENTED SUPERVISING A TIGHTENING PROCESS OF A BOLT USING A TIGHTENING SYSTEM

(71) Applicant: Siemens Gamesa Renewable Energy A/S, Brande (DK)

(72) Inventor: Felix Röse, Cuxhaven (DE)

(73) Assignee: Siemens Gamesa Renewable Energy A/S, Brande (DK)

( * ) Notice: Subject to any disclaimer, the term of this patent is extended or adjusted under 35 U.S.C. 154(b) by 336 days.

(21) Appl. No.: 18/570,448

(22) PCT Filed: Jun. 8, 2022

(86) PCT No.: PCT/EP2022/065522

§ 371 (c)(1),
(2) Date: Dec. 14, 2023

(87) PCT Pub. No.: WO2022/268505

PCT Pub. Date: Dec. 29, 2022

(65) Prior Publication Data

US 2024/0286256 A1 Aug. 29, 2024

(30) Foreign Application Priority Data

Jun. 22, 2021 (EP) .................................... 21180959

(51) Int. Cl.
*B25B 23/147* (2006.01)

(52) U.S. Cl.
CPC ........ *B25B 23/147* (2013.01); *F05B 2230/60* (2013.01); *F05B 2260/301* (2013.01); *F05B 2260/80* (2013.01)

(58) Field of Classification Search
CPC ..... B23P 19/066; B25B 23/14; B25B 23/147; B25B 23/1475; H02P 2205/05
See application file for complete search history.

(56) References Cited

U.S. PATENT DOCUMENTS 3,939,920 A 2/1976 Hardiman et al.
4,488,437 A 12/1984 Pere
(Continued)

FOREIGN PATENT DOCUMENTS

CN 107498299 A 12/2017
CN 109213008 A 1/2019
(Continued)

OTHER PUBLICATIONS

PCT International Search Report and Written Opinion of International Searching Authority mailed Aug. 19, 2022 corresponding to PCT International Application No. PCT/EP2022/065522 filed Jun. 8, 2022.

(Continued)

*Primary Examiner* — Bryan R Muller
(74) *Attorney, Agent, or Firm* — Schmeiser, Olsen & Watts, LLP

(57) ABSTRACT

A method for computer-implemented supervising a tightening process of a bolt includes: a man-operated tightening tool including an actuator for turning the bolt, configured to be switchable between tightening sequence, and a loosening sequence. A sensor unit for determining a one parameter of the bolted connection during and/or after completion of a tightening sequence; wherein the tightening system further includes a processing unit for processing the at least one parameter received from the sensor unit, wherein the processing unit is configured to determine a status of the bolted connection based on the at least one parameter, wherein the status includes a first status indicating a correct bolted connection and a second status indicating a faulty bolted connection; and a user interface for outputting connection information about the bolted connection.

13 Claims, 4 Drawing Sheets

(56) References Cited

U.S. PATENT DOCUMENTS

| | | | | | |
|---|---|---|---|---|---|
| 6,144,891 | A * | 11/2000 | Murakami | B23P 19/10<br>81/467 |
| 8,561,715 | B2 * | 10/2013 | Gut | B25F 5/001<br>173/176 |
| 11,491,617 | B2 * | 11/2022 | Leong | B25B 23/1475 |
| 2005/0223856 | A1 * | 10/2005 | Reynertson | B25B 23/1425<br>81/467 |
| 2014/0350724 | A1 | 11/2014 | Johst et al. | |
| 2016/0303739 | A1 | 10/2016 | Apkarian et al. | |
| 2017/0043460 | A1 * | 2/2017 | Gustafsson | B25B 23/1456 |

FOREIGN PATENT DOCUMENTS

| | | | |
|---|---|---|---|
| CN | 110524231 | A | 12/2019 |
| CN | 112935780 | A | 6/2021 |
| JP | 2009274153 | A | 11/2009 |
| JP | 2015505279 | A | 2/2015 |
| JP | 2015058500 | A | 3/2015 |
| WO | 2012067602 | A1 | 5/2012 |

OTHER PUBLICATIONS

CN Office Action dated Jan. 31, 2026; Chinese Patent Application No. 202280044792.5(PCT/EP2022/065522), 16 pages.

* cited by examiner

| PN | ST | P1 | P2 | POS |
|---|---|---|---|---|
| 1 | OK | 32 | 10 | 10/20/30 |
| | | | | |
| | | | | |
| | | | | |
| | | | | |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| | | | | |
| | | | | |
| | | | | |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3 | OK | 32 | 11 | 10/20/34 |
| | | | | |
| | | | | |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3 | OK | 32 | 11 | 10/20/34 |
| 4 | OK | 40 | 15 | 10/20/30 |
| | | | | |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3 | OK | 32 | 11 | 10/20/34 |
| 4 | OK | 40 | 15 | 10/20/30 |
| 5 | OK | 40 | 16 | 10/20/32 |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3 | OK | 32 | 11 | 10/20/34 |
| 4 | OK | 40 | 15 | 10/20/30 |
| 5 | OK | 40 | 16 | 10/20/32 |
| 6 | NOK | 40 | 30 | 10/20/34 |

| PN | ST | P1 | P2 | POS |
|---|---|---|---|---|
| 1 | OK | 32 | 10 | 10/20/30 |
| 2 | OK | 32 | 9 | 10/20/32 |
| | | | | |
| 4 | OK | 40 | 15 | 10/20/30 |
| 5 | OK | 40 | 16 | 10/20/32 |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3.1 | OK | 32 | 11 | 10/20/34 |
| 4 | OK | 40 | 15 | 10/20/30 |
| 5 | OK | 40 | 16 | 10/20/32 |
| | | | | |
| | | | | |

| PN | ST | P1 | P2 | POS |
|---|---|---|---|---|
| 1 | OK | 32 | 10 | 10/20/30 |
| 2 | OK | 32 | 9 | 10/20/32 |
| 3.1 | OK | 32 | 11 | 10/20/34 |
| 4 | OK | 40 | 15 | 10/20/30 |
| 5 | OK | 40 | 16 | 10/20/32 |
| 6.1 | OK | 40 | 14 | 10/20/34 |
| | | | | |

METHOD AND APPARATUS FOR COMPUTER-IMPLEMENTED SUPERVISING A TIGHTENING PROCESS OF A BOLT USING A TIGHTENING SYSTEM

CROSS-REFERENCE TO RELATED APPLICATIONS

This application claims priority to PCT Application No. PCT/EP2022/065522, having a filing date of Jun. 8, 2022, which claims priority to EP application Ser. No. 21/180,959.5, having a filing date of Jun. 22, 2021, the entire contents both of which are hereby incorporated by reference.

FIELD OF TECHNOLOGY

The following relates to a method and an apparatus for computer implemented supervising a tightening process of a bolt using a tightening system.

BACKGROUND

Workpieces in large plant constructions, such as wind turbines, are connected using bolts. The bolts are the main indicator for quality since they have to hold more than 25 years under hard conditions. If a bolt connection fails, the whole construction can collapse. Therefore, a quality control of the tightening process of the bolted connections is very important. For documentation reasons, every process step in tightening the bolts has to be monitored and stored in a monitoring system.

Currently, the information about a tightening step has to be confirmed manually by a worker. Information about technical parameters have to be confirmed in different software systems which takes a lot of time and provides only a manual quality control afterwards.

There are existing software tools for monitoring the process of tightening bolts which are used in the automotive industry. They are guiding the worker through the tightening process. Sometimes, such software tools are combined with positioning systems which check whether the worker is conducting a process step at the right place. An assembly line production ensures that the product will always come to the same point in the station. It is therefore easy to predefine the position of bolts of the product so that it is easy to integrate a positioning system for quality control.

Such existing software tools cannot be used in large plant constructions because of the different working environment. In large plant constructions, a product or workpiece will be moved or craned from one station to another station, so that the product or the workpiece is not always at the same position in the station. After the product comes into the station, there are many workers that are working all around the product for a long time which makes it difficult to make use of the existing software tools from the automotive industry.

SUMMARY

An aspect relates to provide an easy method in order to monitor the tightening process of a bolt using a tightening system.

Embodiments of the invention provide a method for computer implemented supervising a tightening process of a bolt using a tightening system.

The tightening system comprises a man-operated tightening tool comprising an actuator for turning the bolt which is configured to be switchable between a first operation mode, in which the actuator of the tightening tool is operable with at least one tightening sequence, and a second operation mode, in which the actuator of the tightening tool is operable with a loosening sequence. Each of the tightening sequence and the loosening sequence comprises predetermined operation parameters for the actuator of the tightening tool. Furthermore, the tightening tool has a sensor unit for determining at least one parameter of the bolted connection during and/or after completion of a tightening sequence. Each of the at least one parameters represent a quality measure of the bolted connection.

In addition, the tightening system comprises a processing unit for processing the at least one parameter received from the sensor unit wherein the processing unit is configured to determine a status of the bolted connection based on the at least one parameter, wherein the status comprises a first status indicating a correct bolted connection and a second status indicating a faulty bolted connection.

Furthermore, the tightening system comprises a user interface for outputting connection information about the bolted connection. The outputted connection information may be used to guide a worker through the tightening process or to provide feedback to him.

According to the method of embodiments of the invention, the following steps are performed during the operation of the tightening system.

In step a), the at least one parameter of the bolted connection is received by an interface from the tightening tool during and/or after completion of a tightening sequence in the first operation mode.

In step b), the status of the bolted connection is determined upon and/or after completion of the bolted connection.

In step c), the actuator of the tightening tool is switched from the first operation mode to the second operation mode if the status of the bolted connection corresponds to the second status, i.e., a faulty bolted connection is indicated.

In step d), the tightening tool is switched from the second operation mode to a very first tightening sequence of the at least one tightening sequences of the first operation mode to re-tighten the bolt.

The method of embodiments of the invention provides an easy and straightforward method for automated supervising a tightening process of a bolt using a tightening system. In particular, a worker operating the tightening tool does not have to manually input any information in a software tool for quality monitoring. Furthermore, in case of a faulty bolted connection, the operation mode of the tightening tool does not have to manually switched. In case that the processing unit determines that a bolted connection is faulty, loosening of the faulty bolted connection can be made automatically without switching the tightening tool manually. After having finished loosening the faulty bolted connection, the operation mode of the tightening tool is switched again to be able to re-tighten the bolt without switching the tightening tool manually. As a further advantage, in case that a plurality of tightening sequences is necessary to tighten a bolt, it is ensured that re-tightening is started with the very first tightening sequence.

According to a further exemplary embodiment, the method comprises the further step e) of controlling the actuator of the tightening tool from the very first tightening sequence to at least one tightening subsequent sequence of the first operation mode to re-tighten the bolt according to a predetermined order of tightening sequences. According to this embodiment it can be ensured that a complete number of tightening sequences will be carried out by the worker operating the tightening tool regardless from the fact in which of the plurality of tightening sequences an error occurred.

According to a further exemplary embodiment, the steps of switching the tightening tool from the first operation mode to the second operation mode and/or switching the tightening tool from the second operation mode to the very first tightening sequence or one of the subsequent tightening sequences of the first operation mode are performed under automatic control of the processing unit. Hence, the worker does not have to conduct any manual steps for controlling the tightening tool.

According to a further exemplary embodiment, the user interface outputs the status of the bolted connection and/or the at least one parameter representing a quality measure of the bolted connection as connection information on a display. Displaying the connection information on the display enables the worker operating the tightening device to verify whether the bolted connection is correct (OK) or faulty (NOK: Not OK). It is further desirable if the connection information is outputted in real-time.

According to a further exemplary embodiment, step d) is initiated after the following steps have been performed: in a step c1), the at least one parameter of the bolted connection is received from the tightening tool during and/or after completion of the loosening sequence in the second operation mode. In a step c2), it is determined whether the bolted connection is completely loosened. Hence, it can be ensured that, before re-tightening of the bolt with the predetermined number of tightening sequences is started, the bolted connection is completely loosened.

The status of the connection information will be updated every time the worker has worked on the bolt. Therefore, it is desired that the user interface suppresses display the connection of the bolted connection immediately after step c2) is completed.

According to a further exemplary embodiment, the tightening system further comprises a positioning unit configured to determine a position of the tightening tool upon performing a tightening or loosening process of the bolt with respect to a reference point of a product or workpiece to be bolted, wherein the processing unit is configured to perform the following steps: in step e1), the position of the tightening tool is determined upon performing a tightening process of the bolt. In step e2), the position of the tightening tool is stored as a first position if the status of the bolted connection corresponds to the second status. In step e3), the tightening tool for loosening the bolt associated with the second status is released only in case the current position of the tightening tool corresponds to the first position. Hence, a comparison between two positions of the tightening tool is made where the first position corresponds to the working position of the bolt which is marked as faulty. The second position of the tightening tool corresponds to the working position of a bolt which needs to be loosened. In case these two positions match, the tightening tool is released (i.e., can be controlled that its actuator starts turning) and the process of loosening can be started. If there is no match between these positions, the tightening tool is not released. Thus, it cannot be controlled by the worker to turn its actuator. As a result, the worker receives an immediate haptic feedback whether he is working on the correct bolt. As a result, mistakes can be minimized or even avoided.

According to a further exemplary embodiment, a counter associated to a respective bolted connection is increased by 1 if the status of the bolted connection corresponds to the second status, where the counter starts from a predetermined starting value if the status of the bolted connection corresponds to the second status for the first time and starts from the last stored value if the status of the bolted connection corresponds to the second status for each further time. An indication to use a new bolt is outputted on the user interface in case the actual value of the counter exceeds a predetermined threshold value. This particular embodiment may be combined with a storage system, built up with KANBAN logic, which enables supervising whether the worker actually has taken a new bolt.

Besides the above method, embodiments of the invention refers to an apparatus for computer-implemented supervising a tightening process of a bolt using a tightening system, where the apparatus is configured to perform the method according to embodiments of the invention or one or more exemplary embodiments of the method according to embodiments of the invention.

Moreover, embodiments of the invention refer to a computer program product (non-transitory computer readable storage medium having instructions, which when executed by a processor, perform actions) with a program code, which is stored on a non-transitory machine-readable carrier for carrying out the method according to embodiments of the invention or one or more exemplary embodiments thereof when the program code is executed on a computer.

Furthermore, embodiments of the invention refers to a computer program with a program code for carrying out the method according to embodiments of the invention or one or more exemplary embodiments thereof when the program code is executed on a computer.

BRIEF DESCRIPTION

Some of the embodiments will be described in detail, with reference to the following figures, wherein like designations denote like members, wherein.

DETAILED DESCRIPTION

Figure 1:
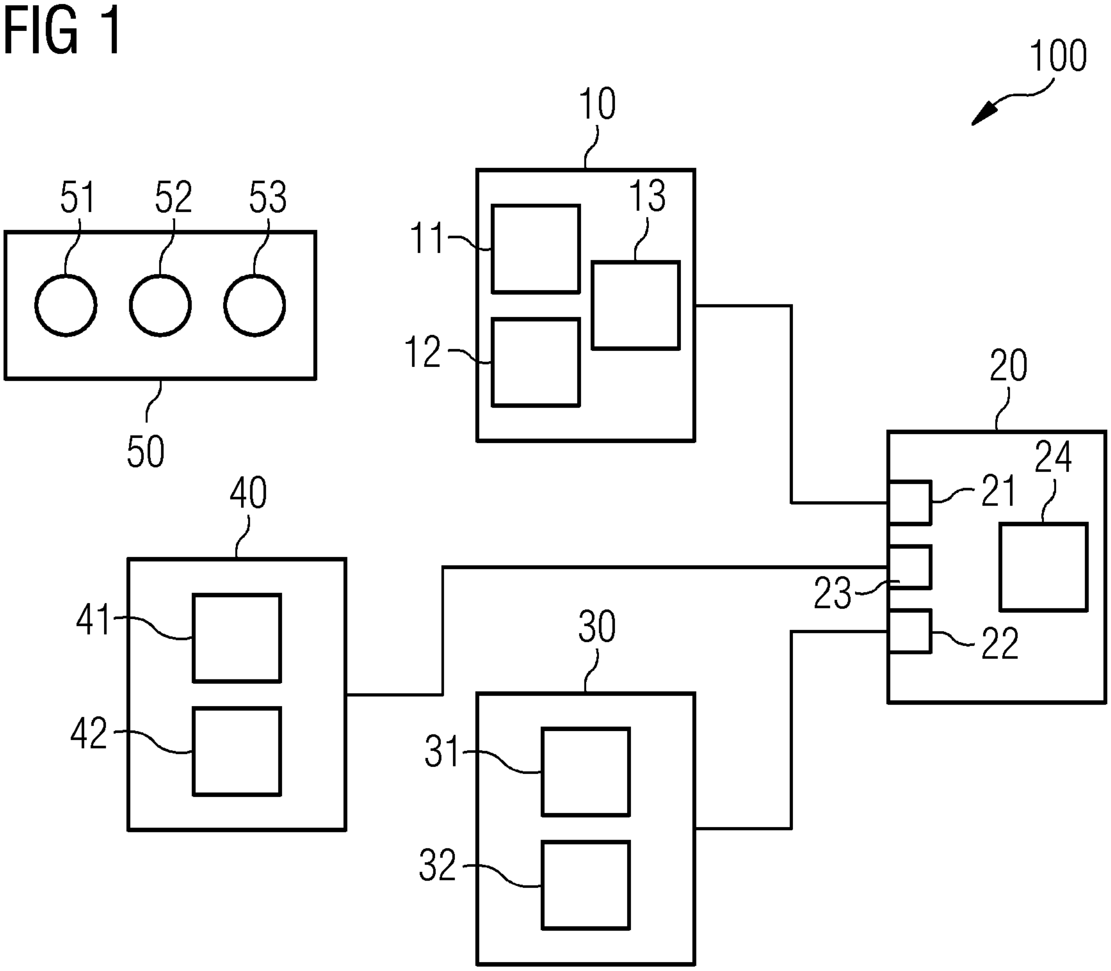
FIG. 1 shows a schematic illustration of a tightening system for computer-implemented supervising a tightening process of a bolt according to embodiment of the invention.

FIG. 1 shows a schematic illustration of a tightening system 100 for computer-implemented supervising a tightening process of bolts according to embodiments of the invention. The tightening system 100 is used, by way of example only, to tighten three bolts 51, 52, 53 of a workpiece 50, for example a wind turbine. However, the workpiece 50 may be any product of a large plant construction which is to be mounted to another product.

The tightening system 100 comprises a man-operated tightening tool 10, a processing unit 20, and a user interface 30. The tightening system 100 may optionally comprise a positioning unit 40 as well.

The tightening tool 10 comprises an actuator 11, a sensor unit 12, and a processor 13. The actuator 11 may be a motor which is connected to a tool holder for subsequently turning the bolts 51, 52, 53. The tightening tool 10 is configured to be switchable between a first operation mode and a second operation mode. Switching between the first operation mode and the second operation mode is made under control of the processor 13. In the first operation mode, the actuator 11 will be rotated in a first rotating direction (forward direction) to tighten the bolts 51, 52, 53. In the second operation mode, the actuator will be rotated in a second rotating direction which is a counter-direction to the first rotating direction (rearward direction) to loosen the bolts 51, 52, 53.

In the first operation mode, the actuator 11 of the tightening tool 10 is operable with one or a plurality of tightening sequences. A respective tightening sequence comprises predetermined control parameters for the actuator 11, such as rotational speed and/or torque, of the tightening tool 10 to reach one or more predetermined parameters, such as torque and/or angle, of the bolted connection during and/or after finishing the tightening process. These predetermined parameters P1, P2 represent quality measures of the bolted connection (see the display screen in FIGS. 3 to 11 which will be referred to later).

If a bolt 51, 52, 53 has to be tightened with a plurality of tightening sequences, the tightening process is executed in multiple steps. For example, in a first step, the bolt 51, 52, 53 is tightened up to 75% of the final torque. After having finished the first step, it has to be waited for settlement of the bolt 51, 52, 53. After the short break, the tightening process is completed by tightening the last 25% to reach the final torque.

In the second operation mode, the actuator 11 of the tightening tool 10 is operable with a loosening sequence. In the loosening sequence the actuator 11 of the tightening tool 10 is controlled such that it rotates in the second rotating direction to fully loosen a bolt 51, 52, 53.

The sensor unit 12 comprises one or more sensors, such as a torque sensor and/or a rotational speed sensor and/or a force sensor and so on. The sensor unit 12 is adapted to determine the one or more parameters P1, P2 of the bolted connection during and/or after completion of a tightening sequence and a loosening sequence, respectively.

The processing unit 20 comprises a first interface 21, a second interface 22, an optional third interface 23 and a processor 24.

The processing unit 20 is connected, via the first interface 21, to the tightening tool 10 for providing respective control data to switch the tightening tool 10 between the first operation mode and the second operation mode as well as to apply the correct control data for a respective tightening sequence in the first operation mode.

Furthermore, the processing unit 20 receives the one or more parameters P1, P2 acquired by the sensor unit 12 via the first interface 21 to determine a status ST of each bolted connection based on the one or more parameters of the sensor unit 12 (see the display screen in FIGS. 3 to 11). The status ST of the bolted connection 12 comprises a first status indicating a correct bolted connection ("OK") and second status indicating a faulty bolted connection ("NOK").

The user interface 30 comprises a display 31 and an input means 32. The display 31 and the input means 32 may be combined in one user interface, such as a touch screen. The display 31 displays information about a bolted connection, such as the one or more parameters P1, P2 of the bolted connection, success or failure of a bolted connection (i.e., the status "OK" or the status "NOK") and so on. The information outputted via the display 31 may guide the worker in the process of tightening the plurality of bolts 51, 52, 53. FIGS. 3 to 11 which will be referred to later illustrate such an example of a display screen.

The user interface 30 is connected to the processing unit 20 via the second interface 22. The information to be displayed on the display 31 is determined by the processor 24 of the processing unit 20 based on sensor data received from the tightening tool 10 and optionally outputted via the second interface 22.

The positioning unit 40 comprises a sensor unit 41 and a processor 42. The sensor unit 41 consists of one or a plurality of sensors, such as one or more cameras, one or more proximity sensors, one or more radar sensors, and so on. The processor 42 is adapted to determine a position of the tightening tool 10 based on the sensor data received from the sensor unit 41 upon performing the tightening or loosening process of a respective bolt 51, 52, 53 with respect to a not shown reference point of the product 52 to be bolted.

Figure 2:
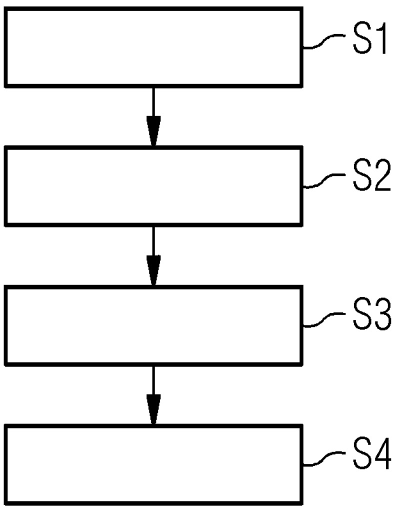
FIG. 2 shows a flow diagram illustrating the different steps according to the method of the invention according to a basic embodiment.

FIG. 2 shows a flow diagram illustrating the different steps according to the method of embodiments of the invention according to a basic embodiment. The method is based on the consideration that monitoring the tightening process by the processing unit 20 and controlling of the tightening tool 10 ensure that the right sequence will be done by a worker even when there are problems. The monitoring and supervision by the processing unit 20 will make the whole tightening process easier. In case of a problem, the tightening tool 10 is controlled for the correct next step which is in addition outputted via the user interface 30.

In a first step S1, the parameters P1, P2 of the bolted connection are received from the tightening tool 10 during and/or after completion of a tightening sequence in the first operation mode. Next, the processing unit 20 determines upon/or after completion of the bolted connection the status (ST) of the bolted connection (step S2). If the status ST corresponds to the second status NOK (i.e., ST=NOK), the tightening tool 10 switches from the first operation mode to the second operation mode (step S3). In the last step S4, the tightening tool 10 switches from the second operation mode to a very first tightening sequence of the at least one tightening sequences of the first operation mode to re-tighten the bolt 51, 52, 53 associated with the second status NOK.

FIGS. 3 to 11 each show on the left-hand side a schematic illustration of the workpiece 50 in which three bolts 51, 52, 53 have to be tightened by a worker using the tightening tool 10. On the right-hand side, an exemplary display screen indicating the progress of bolting is shown. The display screen is outputted on the display 31 for information and guidance of the worker.

By way of example only, the bolts 51, 52, 53 have to be tightened with two tightening sequences, a first tightening sequence requiring a torque of, for example, 32 Nm, and a second tightening sequence requiring a final torque of, for example 40 Nm. It is assumed that both tightening sequences are carried out with the same tightening tool 10 as described in conjunction with FIG. 1. Controlling of the tightening tool 10 with respect to necessary parameters (rotational speed of the actuator, torque, and so on) is made and supervised, as described above, by means of the processing unit 20.

According to a working specification, the bolts 51, 52, 53 will be tightened with the first tightening sequence one after another followed by a tightening process with the second tightening sequence. The progress of tightening will be displayed in the display screen on the right-hand side of each of the FIGS. 3 to 11.

Figure 3:
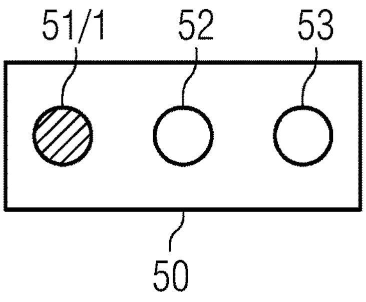
FIG. 3 shows the situation that the first (left) bolt has been tightened with the first tightening sequence.
Figure 4:
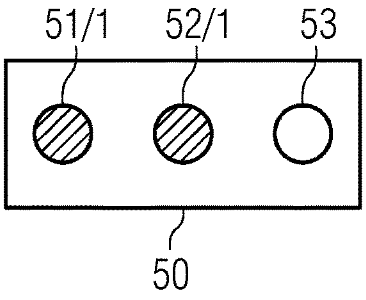
FIG. 4 shows the situation that the second (middle) bolt has been tightened with the first tightening sequence.
Figure 5:
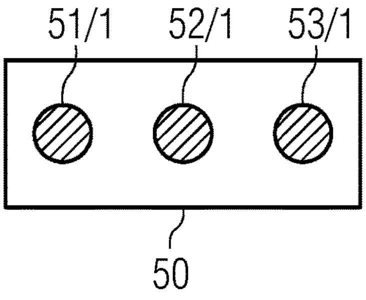
FIG. 5 shows the situation that the third (right) bolt has been tightened with the first tightening sequence.

FIGS. 3 to 5 show the tightening of the bolts 51, 52, 53 after conducting the first tightening sequence. The successful bolted connection after the first tightening sequence is indicated with the suffix "/1" to each of the reference numerals 51, 52, 53 of the bolts and a hatching from below left to top right.

Information about each bolted connection is displayed on the display screen. The display screen shows a process number PN for the current bolting process together with the status ST of the result of the bolting process, parameters P1 and P2 acquired by the sensor unit 12 of the tightening tool 10 and a position information POS acquired by the positioning unit 40. The first parameter P1 represents, for example, a torque of the tightening process, where the torque to be achieved has to be within a predetermined range. The second parameter P2 represents, for example, an angle, where the angle to be achieved has to be within a predetermined range. The coordinates x/y/z of the position POS are indicated relative to a given reference point (not shown) of the workpiece 50. Any suitable coordinate system may be used.

FIG. 3 shows the situation that the first (left) bolt 51 has been tightened with the first tightening sequence. Its process number in the display screen is PN=1. The acquired parameters P1, P2 and the position POS are indicated as P1=32, P2=10 and POS=10/20/30. The processing unit 20 determines from the acquired parameters P1, P2 that the status ST of the bolted connection 51/1 is correct, i.e., ST=OK.

FIG. 4 shows the situation that the second (middle) bolt 52 has been tightened with the first tightening sequence. Its process number in the display screen is PN=2. The acquired parameters P1, P2 and the position POS are indicated as P1=32, P2=9 and POS=10/20/32. The processing unit 20 determines from the acquired parameters P1, P2 that the status ST of the bolted connection 52/1 is correct, i.e., ST=OK.

FIG. 5 shows the situation that the third (right) bolt 53 has been tightened with the first tightening sequence. Its process number in the display screen is PN=3. The acquired parameters P1, P2 and the position POS are indicated as P1=32, P2=11 and POS=10/20/34. The processing unit 20 determines from the acquired parameters P1, P2 that the status ST of the bolted connection 53/1 is correct, i.e., ST=OK.

Figure 6:
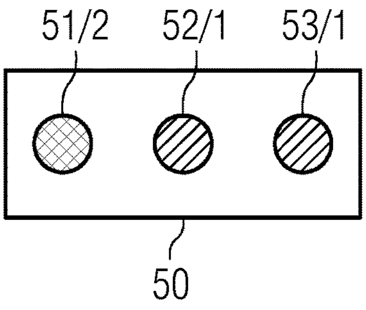
FIG. 6 shows the situation that the first (left) bolt has been tightened with the second tightening sequence.
Figure 7:
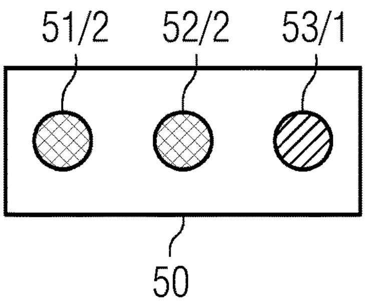
FIG. 7 shows the situation that the second (middle) bolt has been tightened with the second tightening sequence.
Figure 8:
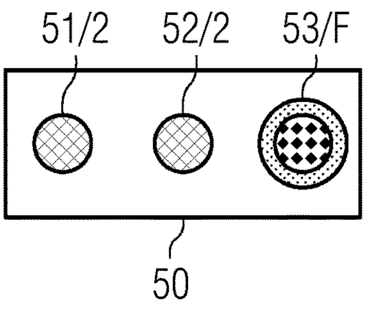
FIG. 8 shows the situation that the third (right) bolt has been tightened with the second tightening sequence.

FIGS. 6 to 8 show the tightening of the bolts 51, 52, 53 after conducting the second tightening sequence. The successful bolted connection after the second tightening sequence is indicated with the suffix "/2" to each of the reference numerals 51, 52, 53 of the bolts and a crossed hatching.

FIG. 6 shows the situation that the first (left) bolt 51 has been tightened with the second tightening sequence. Its process number in the display screen is PN=4. As an alternative display option line PN=1 could have been overwritten. The acquired parameters P1, P2 and the position POS are indicated as P1=40, P2=15 and POS=10/20/30. The processing unit 20 determines from the acquired parameters P1, P2 that the status ST of the bolted connection 51/2 is correct, i.e., ST=OK.

FIG. 7 shows the situation that the second (middle) bolt 52 has been tightened with the second tightening sequence. Its process number in the display screen is PN=5. As an alternative display option line PN=2 could have been overwritten. The acquired parameters P1, P2 and the position POS are indicated as P1=40, P2=16 and POS=10/20/32. The processing unit 20 determines from the acquired parameters P1, P2 that the status ST of the bolted connection 52/2 is correct, i.e., ST=OK.

FIG. 8 shows the situation that the third (right) bolt 53 has been tightened with the second tightening sequence. Its process number in the display screen is PN=6. As an alternative display option line PN=3 could have been overwritten. The acquired parameters P1, P2 and the position POS are indicated as P1=40, P2=30 and POS=10/20/34. The processing unit 20 determines from the acquired parameters P1, P2 that the status ST of the bolted connection 53/2 is faulty, i.e., ST=NOK. This is indicated on the display screen by highlighting line PN=6. Furthermore, the bolted connection of bolt 53 is indicated by 53/F and the different hatching.

As a result of the faulty bolted connection bolt 53 has to be loosened and both, the first and the second tightening sequence, have to be repeated. According to the determination that the status ST corresponds to NOK (second status), the tightening tool 10 is automatically switched from the first operation mode (for tightening a bolt) to the second operation mode (to loosen a bolt), i.e., its rotation direction is reversed. Switching from the first operation mode to the second operation mode is made automatically under the control of the processing unit 20.

As the next step, the worker has to loosen the bolt 53. To avoid that the worker loosens one of the other two correct tightened bolts 51, 52, the positioning unit 40 is configured to release the tightening tool for loosening the bolt 53 only in case that the tightening tool 10 is at the correct position. To do so, the tightening unit 40 is configured to determine the position of the tightening tool 10 upon performing a tightening process of the bolts 51, 52, 53. If the status ST of the bolted connection (here: 53/F) corresponds to NOK, the position of the tightening tool (in our example having the coordinates 10/20/34) is stored in a not shown memory as a first position. When the worker intends to loosen the bolt 53 (or any of the bolts), the position of the tightening tool is determined again. If the current position (having the coordinates 10/20/34) of the tightening tool 10 corresponds to the stored first position, the tightening tool 10 is released such that the bolt 53 can be loosened.

Figure 9:
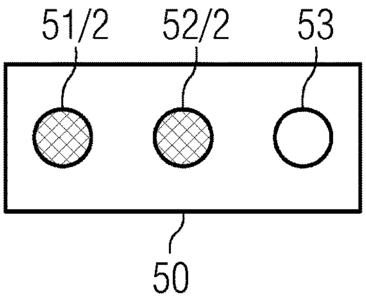
FIG. 9 shows the situation that the third (right) bolt has been loosened
Figure 10:
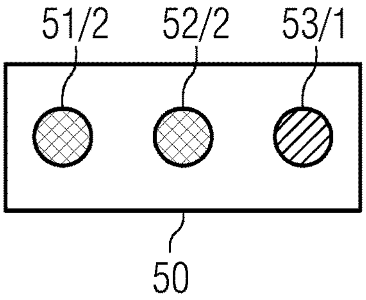
FIG. 10 shows the situation that the third (right) bolt has been tightened with the first tightening sequence.
Figure 11:
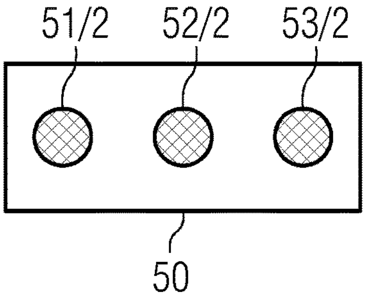
FIG. 11 shows a schematic illustration of a workpiece to be bolted with three bolts and a display screen outputted on a user interface indicating the progress of bolting for a worker operating a tightening tool of the tightening system according to embodiments of the invention.

FIGS. 9 to 11 show the loosening and re-tightening of the bolt 53. The successful bolted connection after the first tightening sequence is again indicated with the suffix "/1" to the reference numeral 53 of the bolt and a hatching from below left to top right. The successful bolted connection after the second tightening sequence is indicated with the suffix /2 to the reference numeral 53 of the bolt 53 and a crossed hatching.

FIG. 9 shows the situation that the third (right) bolt 53 has been loosened. In the display screen, successful loosening is visualized by suppressing display of lines PN=3 and PN=6. The other lines of the display screen remain unchanged.

FIG. 10 shows the situation that the third (right) bolt 53 has been tightened with the first tightening sequence. Its process number in the display screen is now PN=3.1. The acquired parameters P1, P2 and the position POS are indicated as P1=32, P2=11 and POS=10/20/34. The processing unit 20 determines from the acquired parameters P1, P2 that the status ST of the bolted connection 53/1 is correct, i.e., ST=OK.

FIG. 11 shows the situation that the third (right) bolt 53 has been tightened with the second tightening sequence. Its process number in the display screen is PN=6.1. The acquired parameters P1, P2 and the position POS are indicated as P1=40, P2=14 and POS=10/20/34. The processing unit 20 determines from the acquired parameters P1, P2 that the status ST of the bolted connection 53/2 is now correct, i.e., ST=OK.

According to a not shown embodiment, a counter associated to a respective bolted connection may be increased by 1 if the status ST of the bolted connection corresponds to NOK, where the counter starts from a predetermined starting value (e.g., 0) if the status ST of the bolted connection corresponds to NOK for the first time and starts from the last stored value if the status ST of the bolted connection corresponds to NOK for each further time. An indication to use a new bolt is outputted on the user interface in case the actual value of the counter exceeds a predetermined threshold value. This particular embodiment may be combined with a storage system, built up with KANBAN logic, which enables supervising whether the worker actually has taken a new bolt from a storage.

Summarizing, the proposed method has a plurality of advantages:

It can be ensured that the right tightening sequence will be done even when there are problems. In addition, it will make the whole work with the tightening system easier. If there is a problem, the worker is led through the working process, thereby avoiding manual failures.

As there is a data connection between the tightening tool and the processing unit, there is no potential failure or cheating by the worker. The result of a faulty connection will automatically be deleted by the processing unit. As a result, there is no chance that the worker forgets a faulty connection. In addition, the documentation for quality reasons is clean.

With the function of the positioning unit, large plant construction can make use of it to make the production failsafe.

As a result, a new worker guidance system is provided that can ensure a zero-failure production for large plant constructions. The system may be used as the main system for digital quality control in large plant construction.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for computer-implemented supervising a tightening process of a bolt using a tightening system comprising:

providing a man-operated tightening tool including an actuator for turning the bolt, configured to be switchable between a first operation mode, in which the actuator of the tightening tool is operable with at least one tightening sequence, and a second operation mode, in which the actuator of the tightening tool is operable with a loosening sequence, each of the tightening sequence and the loosening sequence comprising predetermined operation parameters for the actuator of the tightening tool, and the tightening tool further comprising a sensor unit for determining at least one parameter of the bolted connection during and/or after completion of a tightening sequence, wherein each of the at least one parameters, representing a quality measure of the bolted connection;

wherein the tightening system further comprises a processing unit for processing the at least one parameter received from the sensor unit, wherein the processing unit is configured to determine a status of the bolted connection based on the at least one parameter, wherein the status comprises a first status indicating a correct bolted connection and a second status indicating a faulty bolted connection; and a user interface for outputting connection information about the bolted connection;

the method comprising the steps of:

a) receiving, by an interface, the at least one parameter of the bolted connection from the tightening tool during and/or after completion of a tightening sequence in the first operation mode;

b) determining upon and/or after completion of the bolted connection the status of the bolted connection;

c) switching the actuator of the tightening tool from the first operation mode to the second operation mode if the status corresponds to the second status; and d) switching the tightening tool from the second operation mode to a very first tightening sequence of the at least one tightening sequences of the first operation mode to re-tighten the bolt wherein step d) is initiated after the following steps have been performed:

c1) receiving the at least one parameter of the bolted connection from the tightening tool during and/or after completion of the loosening sequence in the second operation mode; and c2) determining whether the bolted connection is completely loosened.

2. The method according to claim 1, wherein the method comprises the further step of:

e) controlling the actuator of the tightening tool from the very first tightening sequence to at least one tightening subsequent sequence of the first operation mode to retighten the bolt according to a predetermined order of tightening sequences.

3. The method according to claim 1, wherein the steps of switching the tightening tool from the first operation mode to the second operation mode and/or switching the tightening tool from the second operation mode to the very first tightening sequence or one of the subsequent tightening sequences of the first operation mode is performed under automatic control of the processing unit.

4. The method according to claim 1, wherein the user interface outputs the status of the bolted connection and/or the at least one parameter representing a quality measure of the bolted connection as connection information on a display.

5. The method according to claim 4, wherein the connection information is outputted in real-time.

6. The method according to claim 1, wherein the user interface suppresses display the connection of the bolted connection immediately after step c2) is completed.

7. The method according to claim 1, wherein the tightening system further comprises a positioning unit configured to determine a position of the tightening tool upon performing a tightening or loosening process of the bolt with respect to a reference point of a product to be bolted, wherein the processing unit is configured to perform the following steps:

e1) determining the position of the tightening tool upon performing a tightening process of the bolt;

e2) storing the position of the tightening tool as a first position if the status of the bolted connection corresponds to the second status;

e3) releasing the tightening tool for loosening the bolt associated with the second status only in case the current position of the tightening tool corresponds to the first position.

8. The method according to claim 1, wherein a counter associated to a respective bolted connection is increased by 1 if the status of a bolted connection corresponds to the second status, where the counter starts from a predetermined starting value if the status of the bolted connection corresponds to the second status for the first time and starts from the last stored value if the status of the bolted connection corresponds to the second status for each further time.

9. The method according to claim 8, wherein an indication to use a new bolt is outputted on the user interface in case the actual value of the counter exceeds a predetermined threshold value.

10. A tightening system comprising:

a man-operated tightening tool comprising an actuator for turning the bolt, configured to be switchable between a first operation mode, in which the actuator of the tightening tool is operable with at least one tightening sequence, and a second operation mode, in which the actuator of the tightening tool is operable with a loosening sequence, each of the tightening sequence and the loosening sequence comprising predetermined operation parameters for the actuator of the tightening tool, and having a sensor unit for determining at least one parameter of the bolted connection during and/or after completion of a tightening sequence, each of the at least one parameters representing a quality measure of the bolted connection;

a processing unit for processing the at least one parameters received from the sensor unit wherein the processing unit is configured to determine a status of the bolted connection based on the at least one parameter, the status comprising a first status indicating a correct bolted connection and a second status indicating a faulty bolted connection; and a user interface for outputting connection information about the bolted connection;

the processing unit being configured to perform the following method for computer-implemented supervising a tightening process of a bolt using the tightening system:

a) receiving the at least one parameter of the bolted connection from the tightening tool during and/or after completion of a tightening sequence in the first operation mode;

b) determining upon and/or after completion of the bolted connection the status of the bolted connection;

c) switching the actuator of the tightening tool from the first operation mode to the second operation mode if the status corresponds to the second status;

d) switching the tightening tool from the second operation mode to a very first tightening sequence of the at least one tightening sequences of the first operation mode to re-tighten the bolt wherein the processing unit is configured to initiate step d) after the following steps have been performed:

c1) receiving the at least one parameter of the bolted connection from the tightening tool during and/or after completion of the loosening sequence in the second operation mode; and c2) determining whether the bolted connection is completely loosened.

11. The tightening system according to claim 10, wherein the processing unit is further configured to perform the step of:

e) controlling the actuator of the tightening tool from the very first tightening sequence to at least one tightening subsequent sequence of the first operation mode to retighten the bolt according to a predetermined order of tightening sequences.

12. A computer program product, comprising a computer readable hardware storage device having computer readable program code stored therein, said program code executable by a processor of a computer system to implement a method with program code, which is stored on a non-transitory machine-readable carrier, for carrying out the method according to claim 1 when the program code is executed on a computer.

13. A computer program with program code for carrying out the method according to claim 1 when the program code is executed on a computer.

* * * * *